US011299643B2

(12) United States Patent
Kariya

(10) Patent No.: US 11,299,643 B2
(45) Date of Patent: Apr. 12, 2022

(54) ACTIVE ENERGY RAY CURABLE-TYPE INK JET INK, LIGHT SHIELDING FILM, AND METHOD OF MANUFACTURING LIGHT SHIELDING FILM

(71) Applicant: FUJIFILM CORPORATION, Tokyo (JP)

(72) Inventor: Toshihiro Kariya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/808,372

(22) Filed: Mar. 4, 2020

(65) Prior Publication Data

US 2020/0199385 A1     Jun. 25, 2020

Related U.S. Application Data

(63) Continuation of application No. PCT/JP2018/030316, filed on Aug. 14, 2018.

(30) Foreign Application Priority Data

Sep. 27, 2017  (JP) .............................. JP2017-187087

(51) Int. Cl.
C09D 11/107     (2014.01)
B41M 5/00       (2006.01)
(Continued)

(52) U.S. Cl.
CPC .............. *C09D 11/107* (2013.01); *B41J 2/01* (2013.01); *B41J 2/2107* (2013.01); *B41J 11/002* (2013.01);
(Continued)

(58) Field of Classification Search
CPC ... C09D 11/107; C09D 11/322; C09D 11/101; C09D 11/326; C09D 11/38; C09D 11/36;
(Continued)

(56) References Cited

U.S. PATENT DOCUMENTS 5,712,022 A * 1/1998 Tanaka ..................... B41M 1/30
427/508
2002/0035172 A1* 3/2002 Waki ..................... C09D 11/326
523/160
(Continued)

FOREIGN PATENT DOCUMENTS

CN     1087572 A    6/1994
CN   101397429 A    4/2009
(Continued)

OTHER PUBLICATIONS

International Search Report issued in International Application No. PCT/JP2018/030316 dated Nov. 6, 2018.
(Continued)

*Primary Examiner* — Manish S Shah
(74) *Attorney, Agent, or Firm* — Solaris Intellectual Property Group, PLLC

(57) ABSTRACT

An active energy ray curable-type ink jet ink containing: titanium black; and a monomer A which is a non-aromatic heterocyclic compound having an ethylenically unsaturated double bond, a light shielding film, and a method of manufacturing the light shielding film.

9 Claims, 1 Drawing Sheet

(51) Int. Cl.
  *C09D 11/322* (2014.01)
  *G02B 5/20* (2006.01)
  *B41J 11/00* (2006.01)
  *B41J 2/21* (2006.01)
  *B41J 2/01* (2006.01)
  *C08K 3/11* (2018.01)
(52) U.S. Cl.
  CPC ........ *B41J 11/0021* (2021.01); *B41M 5/0023* (2013.01); *C09D 11/322* (2013.01); *G02B 5/20* (2013.01); *C08K 3/11* (2018.01)
(58) Field of Classification Search
  CPC ......... C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237
  See application file for complete search history.

(56) References Cited

U.S. PATENT DOCUMENTS

| | | |
|---|---|---|
| 2008/0286484 A1 | 11/2008 | Tojo et al. |
| 2009/0082487 A1 | 3/2009 | Kanda |
| 2009/0085996 A1* | 4/2009 | Kasai .................. B41M 5/0011 347/100 |
| 2009/0197056 A1* | 8/2009 | Yokoi .................. C09D 11/101 428/195.1 |
| 2010/0075061 A1* | 3/2010 | Yokoi .................. C09D 11/101 427/487 |
| 2012/0283349 A1* | 11/2012 | Loccufier ................ G03F 7/027 522/14 |
| 2016/0108161 A1* | 4/2016 | Kaneko .................. C09B 23/04 252/586 |
| 2016/0349651 A1* | 12/2016 | Ito ............................. G03G 9/12 |
| 2017/0114233 A1 | 4/2017 | Asami et al. |
| 2017/0252971 A1* | 9/2017 | Umebayashi ............ B41M 5/00 |

FOREIGN PATENT DOCUMENTS

| | | |
|---|---|---|
| EP | 0588533 A2 | 9/1993 |
| JP | 2003-342503 A | 12/2003 |
| JP | 2008-201876 A | 9/2008 |
| JP | 2009-221439 A | 10/2009 |
| JP | 2010-95716 A | 4/2010 |
| JP | 2012-140491 A | 7/2012 |
| JP | 2012-150468 A | 8/2012 |
| JP | 2012-208391 A | 10/2012 |
| JP | 2015-048387 A | 3/2015 |
| JP | 2015-178638 A | 10/2015 |
| JP | 2017-076071 A | 4/2017 |
| JP | 2017-82054 A | 5/2017 |
| WO | 2016/076652 A1 | 5/2016 |

OTHER PUBLICATIONS

Written Opinion of the ISA issued in International Application No. PCT/JP2018/030316 dated Nov. 6, 2018.
Extended European Search Report dated Nov. 3, 2020, issued in corresponding EP Patent Application No. 18862800.2.
English language translation of the following: Office action dated Nov. 19, 2021 from the SIPO in a Chinese patent application No. 201880060750.4 corresponding to the instant patent application. This office action translation is submitted now in order to supplement the understanding of the cited references which are being disclosed in the instant Information Disclosure Statement.

* cited by examiner

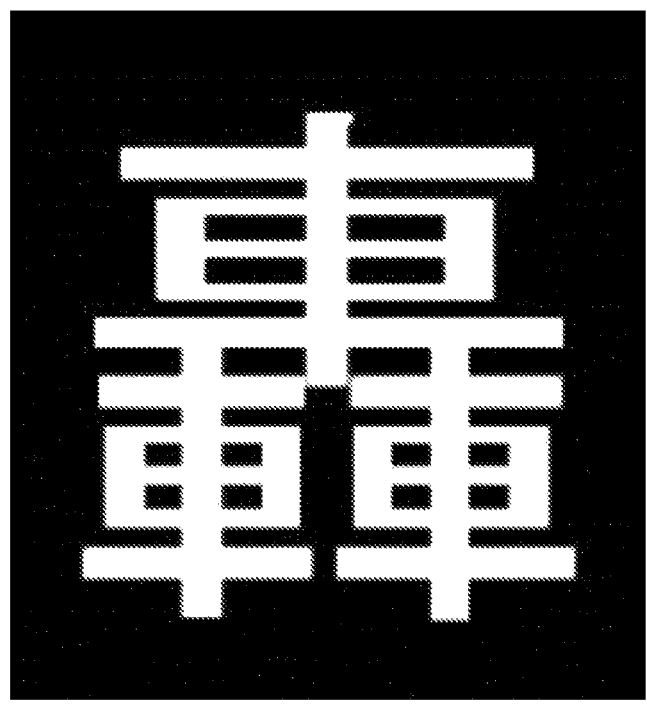

ACTIVE ENERGY RAY CURABLE-TYPE INK JET INK, LIGHT SHIELDING FILM, AND METHOD OF MANUFACTURING LIGHT SHIELDING FILM

CROSS-REFERENCE TO RELATED APPLICATION

This application is a continuation application of International Application No. PCT/JP2018/030316, filed Aug. 14, 2018, the disclosure of which is incorporated herein by reference in its entirety. Further, this application claims priority from Japanese Patent Application No. 2017-187087, filed Sep. 27, 2017, the disclosure of which is incorporated herein by reference in its entirety.

BACKGROUND OF THE INVENTION

1. Field of the Invention

The present disclosure relates to an active energy ray curable-type ink jet ink, a light shielding film, and a method of manufacturing the light shielding film.

2. Description of the Related Art

In various technical fields, black color materials such as carbon black and titanium black are used.

For example, JP2010-095716A discloses, as a black resin composition for providing a color filter which obtains a resin black matrix having a high optical density and a high resistance value irrespective of an achromatic color and enables display of black seemed as true black while being used in a liquid crystal display device, a black resin composition containing at least a light shielding material, a resin, and a solvent, in which at least titanium nitride particles and titanium carbide particles are contained as the light shielding material, and a weight compositional ratio of the titanium nitride particles to the titanium carbide particles is within a range of 80/20 to 20/80.

JP2012-150468A discloses, as a titanium black dispersion composition for forming a light shielding film having high dispersibility of titanium black and high storage stability, a titanium black dispersion composition for forming a light shielding film of a solid-state imaging element which is used for coating by an ink jet method and contains (A) titanium black particles, (B) dispersant, and (C) organic solvent, and in which a BET specific surface area of a dispersed material containing (A) titanium black particles is within a range of 20 m²/g to 120 m²/g, the dispersed material containing (A) titanium black particles contains a Si atom, and a content ratio of Si atoms to Ti atoms in the dispersed material is within a range of 0.01 to 0.45.

JP2012-150468A discloses, as a radiation-sensitive composition having good flatness due to reduced residue in pattern formation leading to no generation of roughness on a top face of the pattern, a radiation-sensitive composition for forming a light shielding film of a solid-state imaging element which contains the above-described titanium black dispersion composition for forming a light shielding film, (D) polymerizable compound, and (E) photopolymerization initiator and is applied in an ink jet manner.

JP2012-208391A discloses, as an ink for forming a light shielding material in an optical lens including the light shielding material having an excellent light shielding property and low glossiness, a light shielding material forming ink containing a black color material, a radically polymerizable monomer having an acryloyloxy group or a methacryloyloxy group, and a photopolymerization initiator, and having a viscosity of 25 mPa·s or less, in which the black color material content is 5 mass % or greater with respect to the total ink amount, and the polymerizable monomer content is 60 mass % or greater with respect to the total ink amount.

JP2012-208391A also discloses that carbon black or titanium black is preferable as the black color material.

SUMMARY OF THE INVENTION

It has been known that carbon black or titanium black is contained in the light shielding film as described above. A technique for forming a light shielding film by an ink jet method has also been known.

However, in the technique for forming a light shielding film containing titanium black by an ink jet method, it may be required to further improve the light shielding property of the light shielding film containing titanium black.

An object of an embodiment of the present disclosure is to provide an active energy ray curable-type ink jet ink capable of forming a light shielding film containing titanium black and having an excellent light shielding property by an ink jet method.

An object of another embodiment of the present disclosure is to provide a light shielding film which can be formed by an ink jet method, contains titanium black, and has an excellent light shielding property.

An object of a further embodiment of the present disclosure is to provide a method of manufacturing a light shielding film by which a light shielding film containing titanium black and having an excellent light shielding property can be formed by an ink jet method.

Specific means for solving the problem include the following embodiments.

<1> An active energy ray curable-type ink jet ink comprising:
titanium black;
a monomer A which is a non-aromatic heterocyclic compound having an ethylenically unsaturated double bond; and
an acidic dispersant.

<2> The active energy ray curable-type ink jet ink according to <1>, further comprising: a monomer B which is an alicyclic compound having an ethylenically unsaturated double bond.

<3> The active energy ray curable-type ink jet ink according to <2>, in which a content of the monomer B is 35 mass % to 200 mass % with respect to a content of the monomer A.

<4> The active energy ray curable-type ink jet ink according to any one of <1> to <3>, in which a content of the monomer A is 10 mass % or greater with respect to a total amount of the monomers.

<5> The active energy ray curable-type ink jet ink according to any one of <1> to <4>, in which a monofunctional monomer content is 80 mass % or greater with respect to a total amount of the monomers.

<6> The active energy ray curable-type ink jet ink according to any one of <1> to <5>, in which an organic solvent content is 1 mass % or less with respect to a total amount of the active energy ray curable-type ink jet ink.

<7> The active energy ray curable-type ink jet ink according to any one of <1> to <6>, further comprising: at least one of a thioxanthone compound or a thiochromanone compound.

<8> The active energy ray curable-type ink jet ink according to <7>, in which a total content of the thioxanthone compound and the thiochromanone compound is 1 mass % to 8 mass % with respect to a total amount of the active energy ray curable-type ink jet ink.

<9> The active energy ray curable-type ink jet ink according to any one of <1> to <8>, in which the acidic dispersant has an acid value of 20 mgKOH/g or greater.

<10> A light shielding film which is a cured product of the active energy ray curable-type ink jet ink according to any one of <1> to <9>.

<11> A method of manufacturing a light shielding film, comprising: a step of applying the active energy ray curable-type ink jet ink according to any one of <1> to <9> to a base material by an ink jet method to form an ink film; and a step of irradiating the ink film with active energy rays to cure the ink film, thereby obtaining a light shielding film.

According to an embodiment of the present disclosure, there is provided an active energy ray curable-type ink jet ink capable of forming a light shielding film containing titanium black and having an excellent light shielding property by an ink jet method.

According to another embodiment of the present disclosure, there is provided a light shielding film which can be formed by an ink jet method, contains titanium black, and has an excellent light shielding property.

According to a further embodiment of the present disclosure, there is provided a method of manufacturing a light shielding film by which a light shielding film containing titanium black and having an excellent light shielding property can be formed by an ink jet method.

BRIEF DESCRIPTION OF THE DRAWINGS

FIG. 1 is a diagram conceptually showing a part of a fine pattern including a white character (a part of the white character) used for evaluation of fine pattern formability of an ink in Example.

DESCRIPTION OF THE PREFERRED EMBODIMENTS

In this specification, a numerical value range expressed using "to" means a range including numerical values before and after "to" as a lower limit value and an upper limit value.

In this specification, in a case where there are a plurality of substances corresponding to each component in a composition, the amount of each component in the composition means a total amount of the plurality of substances present in the composition unless otherwise noted.

In this specification, the term "step" denotes not only an individual step but also a step which is not clearly distinguishable from another step as long as an intended purpose of the step is achieved.

In this specification, "(meth)acryl" denotes at least one of acryl or methacryl, and "(meth)acrylate" denotes at least one of acrylate or methacrylate.

In this specification, a combination of preferable embodiments is a more preferable embodiment.

[Active Energy Ray Curable-Type Ink Jet Ink]

An active energy ray curable-type ink jet ink according to the embodiment of the present disclosure (hereinafter, also simply referred to as "ink") contains titanium black and a monomer A which is a non-aromatic heterocyclic compound having an ethylenically unsaturated double bond.

With the ink according to the embodiment of the present disclosure, a light shielding film which contains titanium black and has an excellent light shielding property can be formed by an ink jet method.

The reason why such an effect is achieved is presumed as follows. However, the ink according to the embodiment of the present disclosure is not limited by the following assumed reasons.

Forming a light shielding film by an ink jet method is more advantageous in terms of productivity of the light shielding film or the like than that by a photolithography method which is a conventional general method (that is, a method including: forming a coating film by coating using a coating device such as a spin coater; and subjecting the formed coating film to exposure and development to obtain a light shielding film). In the formation of a light shielding film by an ink jet method, it is necessary to secure jettability in jetting an ink from an ink jet head.

Regarding this, the ink according to the embodiment of the present disclosure contains titanium black as a black color material, and thus has higher dispersion stability than in a case where carbon black is contained as a black color material, and the viscosity of the ink can be adjusted within an appropriate range (for example, 10 mPa·s to 40 mPa·s, as a viscosity at 25° C.) even in a case where the black color material is contained at a high concentration. As a result, it is possible to secure the jettability from an ink jet head, required in the ink jet method.

In a case where a light shielding film containing titanium black is formed by an ink jet method, an ink film is formed as an aggregate of dot patterns obtained by an ink by the ink jet method on a base material on which the light shielding film is to be formed. The ink film is cured by being irradiated with active energy rays, and the light shielding film is formed. In a case where a light shielding film is formed by the ink jet method as above, an ink film is formed as an aggregate of dot patterns obtained by an ink. Accordingly, there is a tendency that the uniformity of the thickness of the light shielding film may be likely to decrease as compared to the photolithography method in which a coating film is formed by coating using a coating device. For example, in the light shielding film, there is a tendency that unevenness, a local reduction in film thickness, omission of the dot pattern, or the like may be likely to occur. As a result, a part having a low transmission optical density (that is, a light shielding property) is generated in the light shielding film containing titanium black, and as a result, the transmission optical density of the entire light shielding film containing titanium black may be reduced.

Regarding this, the ink according to the embodiment of the present disclosure contains a combination of a monomer A, which is a non-aromatic heterocyclic compound having an ethylenically unsaturated double bond, and titanium black, and thus it is thought that each of the monomer A and the titanium black is hardly non-uniformly distributed and is likely to exist uniformly in the ink film. As a result, it is thought that polymerization is performed with good uniformity in a case where the ink film is cured by polymerization of the monomer A. Accordingly, it is thought that with the ink according to the embodiment of the present disclosure, it is possible to suppress a reduction in uniformity of the film thickness of the light shielding film (for example, occurrence of unevenness, a local reduction in film thickness, omission of the dot pattern, or the like) in the formation of the light shielding film by the ink jet method, and as a result, it is possible to form a light shielding film having an excellent light shielding property.

Hereinafter, components which may be contained in the ink according to the embodiment of the present disclosure will be described.

<Titanium Black>

The ink according to the embodiment of the present disclosure contains at least one type of titanium black.

Titanium black is a black color material having a titanium atom, and is preferably a black color material containing low-order titanium oxide, titanium oxynitride, or the like.

Regarding the titanium black, the description in known documents such as JP2012-150468A can be appropriately referred to.

The average primary particle diameter of the titanium black is preferably 30 nm to 200 nm, and more preferably 50 nm to 130 nm.

A commercially available product can be used as the titanium black.

Examples of commercially available products of the titanium blacks include Titanium Black 10S, Titanium Black 12S, Titanium Black 13R, Titanium Black 13M, Titanium Black 13M-C, Titanium Black 13R, and Titanium Black 13R-N manufactured by Mitsubishi Materials Electronic Chemicals Co., Ltd.; and TilacK D manufactured by Ako Kasei Co., Ltd.

The titanium black content in the ink is not particularly limited.

The titanium black content in the ink is preferably 3 mass % to 30 mass %, more preferably 5 mass % to 25 mass %, and even more preferably 8 mass % to 20 mass % with respect to a total ink amount.

In a case where the titanium black content is 3 mass % or greater, it is advantageous in terms of light shielding property of a light shielding film to be formed.

In a case where the titanium black content is 30 mass % or less, it is advantageous in terms of jettability of the ink.

<Monomer a which is Non-Aromatic Heterocyclic Compound having Ethylenically Unsaturated Double Bond>

The ink according to the embodiment of the present disclosure contains at least one type of monomer A which is a non-aromatic heterocyclic compound having an ethylenically unsaturated double bond.

The monomer A is a non-aromatic heterocyclic compound having an ethylenically unsaturated double bond.

That is, the monomer A includes an ethylenically unsaturated double bond and a non-aromatic heterocyclic structure.

The monomer A may further include an alicyclic structure and/or an aromatic ring structure.

Examples of the non-aromatic heterocyclic structure in the monomer A include a monocyclic structure, a fused ring structure, a bridged ring structure, and a spirocyclic structure. Among these, a monocyclic structure is particularly preferable.

The non-aromatic heterocyclic structure in the monomer A preferably contains at least one of an oxygen atom or a nitrogen atom as a heteroatom.

Examples of the monomer A include N-vinyl compounds including a non-aromatic heterocyclic structure, (meth)acrylate compounds including a non-aromatic heterocyclic structure, and (meth)acrylamide compounds including a non-aromatic heterocyclic structure.

More specific examples of the monomer A include:

N-vinyl compounds including a non-aromatic heterocyclic structure, such as N-vinylcaprolactam and N-vinylpyrrolidone;

(meth)acrylate compounds including a non-aromatic heterocyclic structure, such as cyclic tri methylol propane formal (meth)acrylate, tetrahydrofurfuryl (meth)acrylate, caprolactone-modified (meth)acrylate, alkoxylated tetrahydrofurfuryl (meth)acrylate, lactone-modified tetrahydrofurfuryl (meth)acrylate, (3-methyl-3-oxetanyl) methyl (meth)acrylate, pentamethylpiperidyl (meth)acrylate, tetramethylpiperidyl (meth)acrylate, 2,2-dimethyl-4-(meth)acryloyloxymethyldioxolane,
2-ethyl-2-methyl-4-(meth)acryloyloxymethyldioxolane,
γ-butyrolactone (meth)acrylate, mevalonic lactone (meth)acrylate, and glycidyl (meth)acrylate; and (meth)acrylamide compounds including a non-aromatic heterocyclic structure, such as (meth)acryloylmorpholine, 1-(meth)acryloylpyrrolidine, 1-(meth)acryloylpiperidine, and 1-(meth)acryloylpiperidin-2-one.

As the monomer A, a monofunctional monomer is preferable.

In this specification, the number of a functional group of the monomer means the number of a polymerizable group (for example, a group including an ethylenically unsaturated double bond) in one molecule.

The molecular weight of the monomer A is preferably 1,000 or less, and more preferably 500 or less.

The content of the monomer A with respect to a total amount of the monomers contained in the ink (hereinafter, also referred to as "ratio [monomer A/total monomer amount]") is preferably 5 mass % or greater, more preferably 10 mass % or greater, and particularly preferably 15 mass % or greater.

In a case where the ratio [monomer A/total monomer amount] is 5 mass % or greater, the light shielding property of a light shielding film to be formed can be further improved.

In addition, in a case where the ratio [monomer A/total monomer amount] is 5 mass % or greater, the formability for a case where a light shielding film is formed as a fine pattern (hereinafter, also referred to as "fine pattern formability of ink") can be further improved.

The upper limit of the ratio [monomer A/total monomer amount] is not particularly limited.

The upper limit of the ratio [monomer A/total monomer amount] is preferably 70 mass %, more preferably 50 mass %, and even more preferably 40 mass %.

<Monomer B which is Alicyclic Compound having Ethylenically Unsaturated Double Bond>

The ink according to the embodiment of the present disclosure preferably further contains at least one type of monomer B which is an alicyclic compound having an ethylenically unsaturated double bond.

In a case where the ink according to the embodiment of the present disclosure contains the monomer B, the light shielding property of a light shielding film to be formed can be further improved.

In a case where the ink according to the embodiment of the present disclosure contains the monomer B, the fine pattern formability of the ink can also be further improved.

The reason why these effects are achieved in a case where the ink according to the embodiment of the present disclosure contains the monomer B is not clear, but is presumed to be because the aggregation of titanium black in the ink is further suppressed.

The monomer B is an alicyclic compound having an ethylenically unsaturated double bond.

Here, the alicyclic compound having an ethylenically unsaturated double bond means a compound including an ethylenically unsaturated double bond and an alicyclic structure and not including a heterocyclic structure.

Examples of the alicyclic structure in the monomer B include a monocyclic structure, a fused ring structure, a bridged ring structure, and a spirocyclic structure. The alicyclic structure in the monomer B particularly preferably includes at least one of a fused ring structure or a bridged ring structure.

Examples of the monomer B include vinyl compounds including an alicyclic structure, (meth)acrylate compounds including an alicyclic structure, and (meth)acrylamide compounds including an alicyclic structure.

More specific examples of the monomer B include:
vinyl compounds including an alicyclic structure, such as vinylcyclopentane, vinylcyclopentene, vinylcyclohexane, vinylcyclohexene, vinylnorbornane, vinylnorbornene, vinylisobornane, vinylisobornene, and vinyladamantane;
(meth)acrylate compounds including an alicyclic structure, such as isobornyl (meth)acrylate, dicyclopentenyl (meth) acrylate, norbornyl (meth)acrylate, dicyclopentenyloxyethyl (meth)acrylate, dicyclopentanyl (meth)acrylate, dicyclopentanyloxyethyl (meth)acrylate, cyclohexyl (meth)acrylate, 4-t-butylcyclohexyl acrylate, 3,3,5-trimethylcyclohexyl acrylate, cyclopentyl (meth)acrylate, and adamantyl (meth)acrylate; and
(meth)acrylamide compounds including an alicyclic structure such as N-cyclohexyl (meth)acrylamide and N-norbornyl (meth)acrylamide.

Among these, (meth)acrylate compounds including an alicyclic structure are preferable.

As the monomer B, a monofunctional monomer (that is, a monomer having only one ethylenically unsaturated double bond) is preferable.

The double bond in a cyclic structure, such as a double bond in an alicyclic structure of dicyclopentenyl (meth) acrylate, does not correspond to the ethylenically unsaturated double bond in this specification.

The molecular weight of the monomer B is preferably 1,000 or less, and more preferably 500 or less.

In a case where the ink according to the embodiment of the present disclosure contains the monomer B, the content of the monomer B with respect to the content of the monomer A in the ink (hereinafter, also referred to as "ratio [monomer B/monomer A]") is preferably 0 mass % to greater than 300 mass %, more preferably 30 mass % to 250 mass %, even more preferably 35 mass % to 200 mass %, and still more preferably 35 mass % to 170 mass %.

In a case where the ratio [monomer B/monomer A] is 0 mass % to greater than 300 mass %, the light shielding property of a light shielding film to be formed can be further improved.

In a case where the ratio [monomer B/monomer A] is 0 mass % to greater than 300 mass %, the fine pattern formability of the ink can also be further improved.

<Aromatic Monomer>

The ink according to the embodiment of the present disclosure may contain at least one type of aromatic monomer.

The aromatic monomer mentioned herein means a monomer including an aromatic ring structure and including a heterocyclic structure and an alicyclic structure.

As the aromatic monomer, an aromatic compound including an ethylenically unsaturated double bond and an aromatic ring structure and not including a heterocyclic structure and an alicyclic structure is preferable.

Examples of the aromatic ring structure in the aromatic monomer include a monocyclic structure, a fused ring structure, a bridged ring structure, and a spirocyclic structure.

Examples of the aromatic monomer include vinyl compounds including an aromatic ring structure, (meth)acrylate compounds including an aromatic ring structure, and (meth) acrylamide compounds including an aromatic ring structure.

More specific examples of the aromatic monomer include:
vinyl compounds including an aromatic ring structure, such as styrene, p-methylstyrene, p-methoxystrene, β-methylstyrene, p-methyl-β-methylstyrene, α-methylstyrene, and p-methoxy-β-methylstyrene;
(meth)acrylate compounds including an aromatic ring structure, such as phenoxyethyl (meth)acrylate, benzyl (meth) acrylate, and nonylphenoxypolyethylene glycol (meth) acrylate; and
(meth)acrylamide compounds including an aromatic ring structure, such as N-phenyl (meth)acrylamide and N-(methylphenyl) (meth)acrylamide.

As the aromatic monomer, a monofunctional monomer (that is, a monomer having only one ethylenically unsaturated double bond) is preferable.

The molecular weight of the aromatic monomer is preferably 1,000 or less, and more preferably 500 or less.

<Other Monomers>

The ink according to the embodiment of the present disclosure may contain at least one type of monomer other than the monomer A, the monomer B, and the aromatic monomer.

Examples of other monomers include monomers including an ethylenic double bond and not including a heterocyclic structure, an alicyclic structure, and an aromatic ring structure (for example, vinyl compounds, (meth)acrylate compounds, and (meth)acrylamide compounds).

A monofunctional monomer or a bifunctional or higher-functional monomer may be contained as other monomers.

More specific examples of other monomers include:
monofunctional (meth)acrylates (for example, 2-hydroxyethyl (meth)acrylate, polyethylene glycol mono(meth) acrylate, and polypropylene glycol mono(meth)acrylate), bifunctional (meth)acrylates (for example, ethylene glycol di(meth)acrylate, 1,6-hexanediol di(meth)acrylate, 1,9-nonanediol di(meth)acrylate, neopentyl glycol di(meth)acrylate, neopentyl glycol propylene oxide adduct di(meth)acrylate, polypropylene glycol di(meth)acrylate, tetraethylene glycol di(meth)acrylate, and diacrylated isocyanurate), trifunctional or higher-functional (meth)acrylate (for example, trimethylolpropane tri(meth)acrylate, pentaerythritol tri(meth) acrylate, tri((meth)acryloyloxyethyl)phosphate, pentaerythritol tetra(meth) acrylate, dipentaerythritol penta(meth)acrylate, and dipentaerythritol hexa(meth)acrylate).

The molecular weight of other monomers is preferably 2,000 or less, more preferably 1,500 or less, and even more preferably 1,000 or less.

The content of the monofunctional monomer with respect to a total amount of the monomers in the ink according to the embodiment of the present disclosure (hereinafter, also referred to as "ratio [monofunctional monomer/total monomer amount]") is preferably 70 mass % or greater, more preferably 75 mass % or greater, and even more preferably 80 mass % or greater.

In a case where the ratio [monofunctional monomer/total monomer amount] is 70 mass % or greater, the light shielding property of a light shielding film to be formed can be further improved.

In a case where the ratio [monofunctional monomer/total monomer amount] is 70 mass % or greater, the fine pattern formability of the ink can also be further improved.

The ratio [monofunctional monomer/total monomer amount] may be 100 mass %, less than 100 mass %, 99 mass % or less, or 98.5 mass % or less.

The content of the bifunctional or higher-functional monomer with respect to a total amount of the monomers in the ink according to the embodiment of the present disclosure (hereinafter, also referred to as "ratio [bifunctional or higher-functional monomer/total monomer amount]") may be 0 mass %, 1 mass % to 30 mass %, 1 mass % to 25 mass %, 1 mass % to 20 mass %, or 1.5 mass % to 20 mass %.

The content of the trifunctional or higher-functional monomer with respect to a total amount of the monomers in the ink according to the embodiment of the present disclosure (hereinafter, also referred to as "ratio [trifunctional or higher-functional monomer/total monomer amount]") may be 1 mass % to 30 mass %, 1 mass % to 25 mass %, 1 mass % to 20 mass %, or 1.5 mass % to 20 mass %.

In the ink according to the embodiment of the present disclosure, the total amount of the monomers with respect to a total ink amount (hereinafter, also referred to as "ratio [total monomer amount/total ink amount]") is preferably 50 mass %, more preferably 60 mass % or greater, and even more preferably 70 mass % or greater.

In a case where the ratio [total monomer amount/total ink amount] is 50 mass %, the jettability and the curability of the ink can be further improved.

Although depending on the content of other components (titanium black and the like), the upper limit of the ratio [total monomer amount/total ink amount] is, for example, 90 mass %, and preferably 80 mass %.

<Oligomer>

The ink according to the embodiment of the present disclosure may contain at least one type of oligomer.

Here, the "oligomer" is a polymer having a constitutional unit generally based on a finite number of monomers (generally, 5 to 100 monomers).

The weight-average molecular weight of the oligomer is preferably 400 to 10,000, and more preferably 500 to 5,000.

In this specification, a weight-average molecular weight (Mw) refers to a value measured by gel permeation chromatography (GPC). Regarding compounds whose accurate Mw cannot be measured by GPC due to the low molecular weight thereof, a molecular weight determined from the chemical structure of the compound is employed as Mw of the compound.

In the measurement by gel permeation chromatography (GPC), HLC (registered trademark)-8020GPC (Tosoh Corporation) is used as a measuring device, three columns of TSKgel (registered trademark) Super Multipore HZ-H (4.6 mmID×15 cm, Tosoh Corporation) are used, and tetrahydrofuran (THF) is used as an eluent. The measurement is performed using a RI detector under the conditions of a sample concentration of 0.45 mass %, a flow rate of 0.35 ml/min, a sample injection amount of 10 µl, and a measurement temperature of 40° C.

Calibration curves are prepared by eight samples of "REFERENCE SAMPLE TSK standard, polystyrene": "F-40", "F-20", "F-4", "F-1", "A-5000", "A-2500", "A-1000" and "n-propylbenzene".

As the oligomer, an oligomer having a (meth)acryloyl group as a functional group (that is, a polymerizable group) is preferable.

The number of a functional group contained in the oligomer is preferably 1 to 15, more preferably 2 to 6, even more preferably 2 to 4, and particularly preferably 2 per one molecule from the viewpoint of balance between flexibility and curability.

Examples of the oligomer include:
polyester (meth)acrylate-based oligomers;
olefin-based oligomers (ethylene oligomer, propylene oligomer, butene oligomer, and the like);
vinyl-based oligomers (styrene oligomer, vinyl alcohol oligomer, vinyl pyrrolidone oligomer, (meth)acrylate oligomer, and the like);
diene-based oligomers (butadiene oligomer, chloroprene rubber oligomer, pentadiene oligomer, and the like);
ring-opening polymerization-based oligomers (diethylene glycol oligomer, triethylene glycol oligomer, tetraethylene glycol oligomer, polyethylene glycol oligomer, polyethylimine, and the like);
polyaddition-based oligomers (oligoester (meth)acrylate oligomer, polyamide oligomer, polyisocyanate oligomer, and the like);
addition condensation oligomers (phenol resin oligomer, amino resin oligomer, xylene resin oligomer, ketone resin oligomer, and the like); and
amine-modified polyester oligomers.

As the oligomer, an oligoester (meth)acrylate oligomer is preferable.

A urethane (meth)acrylate-based oligomer or a polyester (meth)acrylate-based oligomer is preferable as the oligoester (meth)acrylate oligomer.

A urethane (meth)acrylate-based oligomer is particularly preferable as the oligoester (meth)acrylate oligomer from the viewpoint of obtaining an ink having excellent curability and adhesiveness.

Examples of the urethane (meth)acrylate-based oligomer include aliphatic urethane (meth)acrylate oligomers and aromatic urethane (meth)acrylate oligomers.

Regarding the urethane (meth)acrylate-based oligomer, oligomer Handbook (supervised by Junji Furukawa, Japan Chemical Daily) can be referred to.

Examples of commercially available products of the urethane (meth)acrylate-based oligomer include:
U-2PPA, U-4HA, U-6HA, U-6LPA, U-15HA, U-324A, UA-122P, UA5201, UA-512, and the like manufactured by Shin-Nakamura Chemical Co., Ltd.;
CN964A85, CN964, CN959, CN962, CN963J85, CN965, CN982B88, CN981, CN983, CN996, CN9002, CN9007, CN9009, CN9010, CN9011, CN9178, CN9788, CN9893, and the like manufactured by Sartomer Company, Inc.; and
EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, EB8800-20R, and the like manufactured by DAICEL-ALLNEX LTD.

Examples of commercially available products of the amine-modified polyester oligomer include:
EB524, EB80, EB81, and the like manufactured by DAICEL-ALLNEX LTD.;
CN550, CN501, CN551, and the like manufactured by Sartomer Company, Inc.; and
GENOMER 5275 manufactured by RAHN AG.

In a case where the ink according to the embodiment of the present disclosure contains an oligomer, the oligomer content is preferably 1 mass % to 10 mass %, more preferably 2 mass % to 8 mass %, and even more preferably 3 mass % to 7 mass % with respect to a total ink amount from the viewpoint of balance between curability and adhesiveness.

<Dispersant>

The ink according to the embodiment of the present disclosure preferably contains at least one type of dispersant from the viewpoint of a further improvement in dispersion stability of titanium black.

As the dispersant, an acidic dispersant or a basic dispersant is preferable.

As the dispersant, an acidic dispersant is more preferable.

In a case where the dispersant is an acidic dispersant, the light shielding property of a light shielding film to be formed is further improved. The reason for this is presumed as follows.

It is thought that the dispersion stability of the titanium black in the ink is further improved in a case where the dispersant is an acidic dispersant. Accordingly, in an ink film formed by applying the ink to a base material, it is thought that the uniformity of the existence density of the titanium black is further improved, and as a result, the light shielding property of a light shielding film is further improved.

The acid value of the acidic dispersant is preferably 5 mgKOH/g or greater, more preferably 10 mgKOH/g or greater, even more preferably 15 mgKOH/g or greater, and even more preferably 20 mgKOH/g or greater from the viewpoint of a further improvement in fine pattern formability of the ink.

Although the upper limit of the acid value of the acidic dispersant is not particularly limited, the upper limit is, for example, 200 mgKOH/g, and preferably 150 mgKOH/g.

The amine value of the basic dispersant is preferably 5 mgKOH/g or greater, more preferably 10 mgKOH/g or greater, even more preferably 15 mgKOH/g or greater, and even more preferably 20 mgKOH/g or greater.

Although the upper limit of the amine value of the basic dispersant is not particularly limited, the upper limit is, for example, 200 mgKOH/g, and preferably 150 mgKOH/g.

As the dispersant, any of a low-molecular-weight dispersant or a polymer dispersant can be used.

The weight-average molecular weight (Mw) of the dispersant is preferably 500 to 200,000, more preferably 800 to 50,000, and even more preferably 1,000 to 30,000.

A commercially available product may be used as the dispersant.

Examples of commercially available products of an acidic polymer dispersant having an acid value of 5 mgKOH/g to 200 mgKOH/g are as follows.

That is, the examples include SOLSPERSE-16000, 21000, 41000, 41090, 43000, 44000, 46000, 54000, and the like in SOLSPERSE (registered trademark) series of Lubrizol Corporation, DISPERBYK-102, 110, 111, 118, 170, 190, 194N, 2015, 2090, 2096, and the like in DISPERBYK (registered trademark) series of BYK-CHEMIE, TEGO Dispers 610, 610S, 630, 651, 655, 750W, 755W, and the like in TEGO (registered trademark) Dispers series of Evonik Industries AG, DA-375, DA-1200, and the like in DISPARLON (registered trademark) series manufactured by Kusumoto Chemicals, Ltd., and WK-13E, G-700, G-900, GW-1500, GW-1640, WK-13E, and the like in FLOWLEN series manufactured by Kyoei Kagaku Kogyo.

Examples of the basic dispersant having an amine value of 5 mgKOH/g to 200 mgKOH/g is DISPERBYK-108 manufactured by BYK-CHEMIE.

The dispersant content in the ink is preferably 1 to 80 mass %, more preferably 10 to 60 mass %, and even more preferably 20 to 40 mass % with respect to a total amount of titanium black.

<Polymerization Initiator>

The ink according to the embodiment of the present disclosure preferably contains at least one type of polymerization initiator.

As the polymerization initiator, a known radical polymerization initiator absorbing active energy rays and generating radicals that are polymerization initiating species can be used.

Preferable examples of the polymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having a carbon halogen bond, and (m) alkylamine compound.

These polymerization initiators may be used alone or in combination of two or more types of the compounds of (a) to (m).

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferable examples thereof include the α-thiobenzophenone compounds described in JP1972-006416B (JP-S47-006416B), the benzoin ether compounds described in JP1972-003981B (JP-S47-003981B), the α-substituted benzoin compounds described in JP1972-022326B (JP-S47-022326B), the benzoin derivatives described in JP1972-023664B (JP-S47-023664B), the aroylphosphonic acid esters described in JP1982-030704A (JP-S57-030704A), the dialkoxybenzophenones described in JP1985-026483B (JP-S60-026483B), the benzoin ethers described in JP1985-026403B (JP-S60-026403B) and JP1987-081345A (JP-S62-081345A), the α-aminobenzophenones described in JP1989-034242B (JP-S01-034242B), U.S. Pat. No. 4,318,791A, and EP0284561A1, the p-di(dimethylaminobenzoyl) benzenes described in JP1990-211452A (JP-H02-211452A), the thio-substituted aromatic ketones described in JP1986-194062A (JP-S61-194062A), the acylphosphine sulfides described in JP1990-009597B (JP-H02-009597B), the acylphosphines described in JP1990-009596B (JP-S02-009596B), the thioxanthones described in JP1988-061950B (JP-S63-061950B), and the coumarins described in JP1984-042864B (JP-S59-042864B).

The polymerization initiators described in JP2008-105379A and JP2009-114290A are also preferable.

Among these, (a) carbonyl compound or (b) acylphosphine oxide compound is more preferably contained as the polymerization initiator. Specific examples thereof include bis(2,4,6-trimethylbenzoyl)phenylphosphine oxide (for example, IRGACURE (registered trademark) 819 manufactured by BASF SE), 2-(dimethylamino)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxycyclohexyl phenyl ketone (for example, IRGACURE (registered trademark) 184 manufactured by BASF SE), and 2,4,6-trimethylbenzoyl diphenyl phosphine oxide (for example, DAROCUR (registered trademark) TPO and LUCIRIN (registered trademark) TPO (all manufactured by BASF SE)).

Among these, (b) acylphosphine oxide compound is preferable as a photopolymerization initiator from the viewpoint of an improvement in sensitivity and adaptability to LED light, and a monoacylphosphine oxide compound (particularly preferably, 2,4,6-trimethylbenzoyldiphenylphosphine oxide) or a bisacylphosphine oxide compound (particularly preferably, bis(2,4,6-trimethylbenzoyl)phenylphosphine oxide) is more preferable.

In a case where the ink according to the embodiment of the present disclosure contains a polymerization initiator, the polymerization initiator content is preferably 2 mass % to 20 mass %, and more preferably 4 mass % to 15 mass % with respect to a total ink amount.

<Thioxanthone Compound, Thiochromanone Compound>

The ink according to the embodiment of the present disclosure preferably contains at least one of a thioxanthone compound or a thiochromanone compound.

In a case where the ink according to the embodiment of the present disclosure contains at least one of a thioxanthone compound or a thiochromanone compound, the light shielding property of a light shielding film is further improved.

In a case where the ink according to the embodiment of the present disclosure contains a thioxanthone compound, only one type of thioxanthone compound may be contained, or two or more types of thioxanthone compounds may be contained.

In a case where the ink according to the embodiment of the present disclosure contains a thiochromanone compound, only one type of thiochromanone compound may be contained, or two or more types of thiochromanone compounds may be contained.

Paragraphs 0066 to 0077 of JP2012-046724A may be referred to regarding the thioxanthone compound and the thiochromanone compound.

(Thioxanthone Compound)

A compound represented by Formula (1) is preferable as the thioxanthone compound.

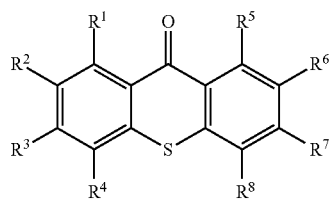

In Formula (1), $R^1$ to $R^8$ each independently represent a hydrogen atom, an alkyl group, a halogen atom, a hydroxy group, a cyano group, a nitro group, an amino group, an alkylthio group, an alkylamino group (including a mono- or di-substituted alkylamino group), an alkoxy group, an alkoxycarbonyl group, an acyloxy group, an acyl group, a carboxy group, or a sulfo group.

In each of the alkyl group, the alkylthio group, the alkylamino group, the alkoxy group, the alkoxycarbonyl group, the acyloxy group, and the acyl group, the alkyl moiety preferably has 1 to 20 carbon atoms, more preferably 1 to 8 carbon atoms, and even more preferably 1 to 4 carbon atoms.

The acyloxy group may be an aryloxycarbonyl group, and the acyl group may be an arylcarbonyl group. In this case, in each of the aryloxycarbonyl group and the arylcarbonyl group, the aryl moiety preferably has 6 to 14 carbon atoms, and more preferably 6 to 10 carbon atoms.

Adjacent two of $R^1$ to $R^8$ may be connected to each other to form a ring structure.

Examples of the ring structure include a 5-membered or 6-membered monocyclic structure; and a binuclear ring (for example, a fused ring) in which two 5-membered or 6-membered monocyclic structures are combined.

Examples of the 5-membered or 6-membered monocyclic structure include an aliphatic ring, an aromatic ring, and a heterocyclic ring. Examples of the heteroatom in the heterocyclic ring include N, O, and S. Examples of the combination of monocyclic rings in the binuclear ring include a combination of an aliphatic ring and an aliphatic ring, a combination of an aliphatic ring and an aromatic ring, a combination of an aliphatic ring and a heterocyclic ring, a combination of an aromatic ring and an aromatic ring, a combination of an aromatic ring and a heterocyclic ring, and a combination of a heterocyclic ring and a heterocyclic ring.

The ring structure may have a substituent. Examples of the substituent include an alkyl group, a halogenated alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group.

As the halogen atom, a fluorine atom, a chlorine atom, a bromine atom, or an iodine atom is preferable, a chlorine atom, a bromine atom, or an iodine atom is more preferable, and a chlorine atom or a bromine atom is even more preferable.

As the halogenated alkyl group, a fluorinated alkyl group is preferable.

Examples of the thioxanthone compound include thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfylthioxanthone, 3,4-di [2-(2-methoxyethoxy) ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboximide, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3, 4-dimethyl-9-oxo-9H-thioxanthone-2-yloxy)-N,N,N-trimethyl-1-propanaminium chloride.

Among these, 2,4-diethylthioxanthone, 2-isopropylthioxanthone, or 4-isopropylthioxanthone is preferable from the viewpoint of availability and curability.

<Thiochromanone Compound>

A compound represented by Formula (2) is preferable as the thiochromanone compound.

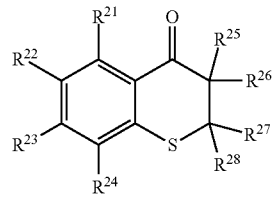
(2)

In Formula (2), $R^{21}$ to $R^{28}$ are synonymous with $R^1$ to $R^8$ in Formula (1), respectively, and preferable aspects are also the same.

Adjacent two of $R^{21}$ to $R^{24}$ in Formula (2) may be connected to each other to form a ring structure.

Examples of the ring structure which can be formed by adjacent two of $R^{21}$ to $R^{24}$ in Formula (2) are the same as the examples of the ring structure which can be formed by adjacent two of $R^1$ to $R^8$ in Formula (1).

The thiochromanone compound may have at least one substituent (an alkyl group, a halogenated alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group) on the ring structure of thiochromanone.

As the substituent, an alkyl group, a halogen atom, a hydroxy group, an alkylthio group, an alkylamino group, an alkoxy group, or an acyloxy group is preferable, an alkyl group or a halogen atom having 1 to 20 carbon atoms is more preferable, and an alkyl group or a halogen atom having 1 to 4 carbon atoms is even more preferable.

As the halogen atom, a fluorine atom, a chlorine atom, a bromine atom, or an iodine atom is preferable, a chlorine atom, a bromine atom, or an iodine atom is more preferable, and a chlorine atom or a bromine atom is even more preferable.

As the halogenated alkyl group, a fluorinated alkyl group is preferable.

The thiochromanone compound is more preferably a compound having at least one substituent on each of the aromatic ring and the cyclohexanone ring.

Specific examples of the thiochromanone compound include the following (2-1) to (2-30). Among these, (2-14), (2-17), or (2-19) is more preferable, and (2-14) is even more preferable.

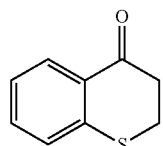
(2-1)

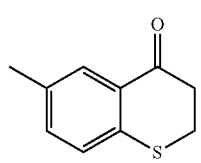
(2-2)

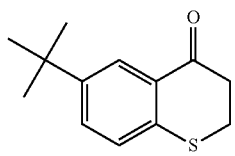
(2-3)

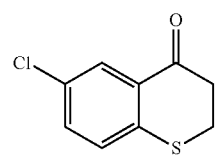
(2-4)

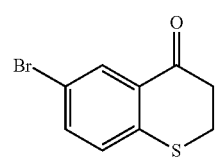
(2-5)

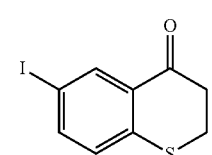
(2-6)

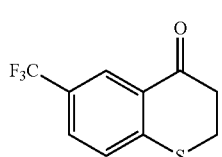
(2-7)

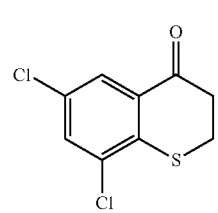
(2-8)

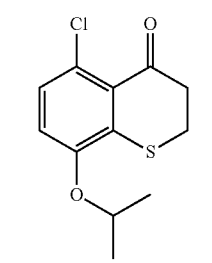
(2-9)

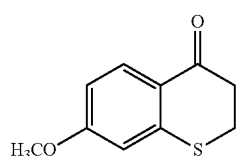
(2-10)

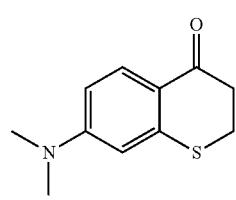
(2-11)

-continued
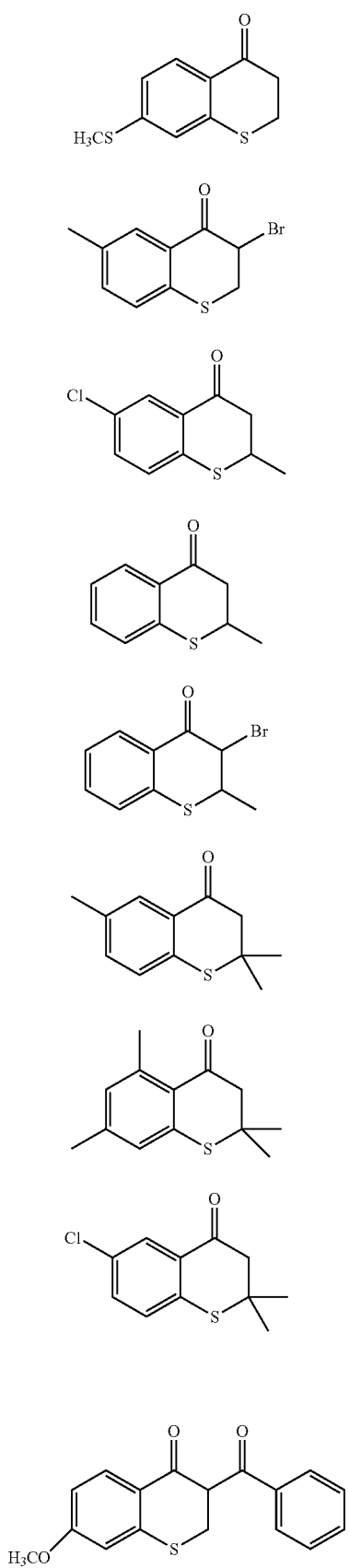
(2-12)
(2-13)
(2-14)
(2-15)
(2-16)
(2-17)
(2-18)
(2-19)
(2-20)
-continued
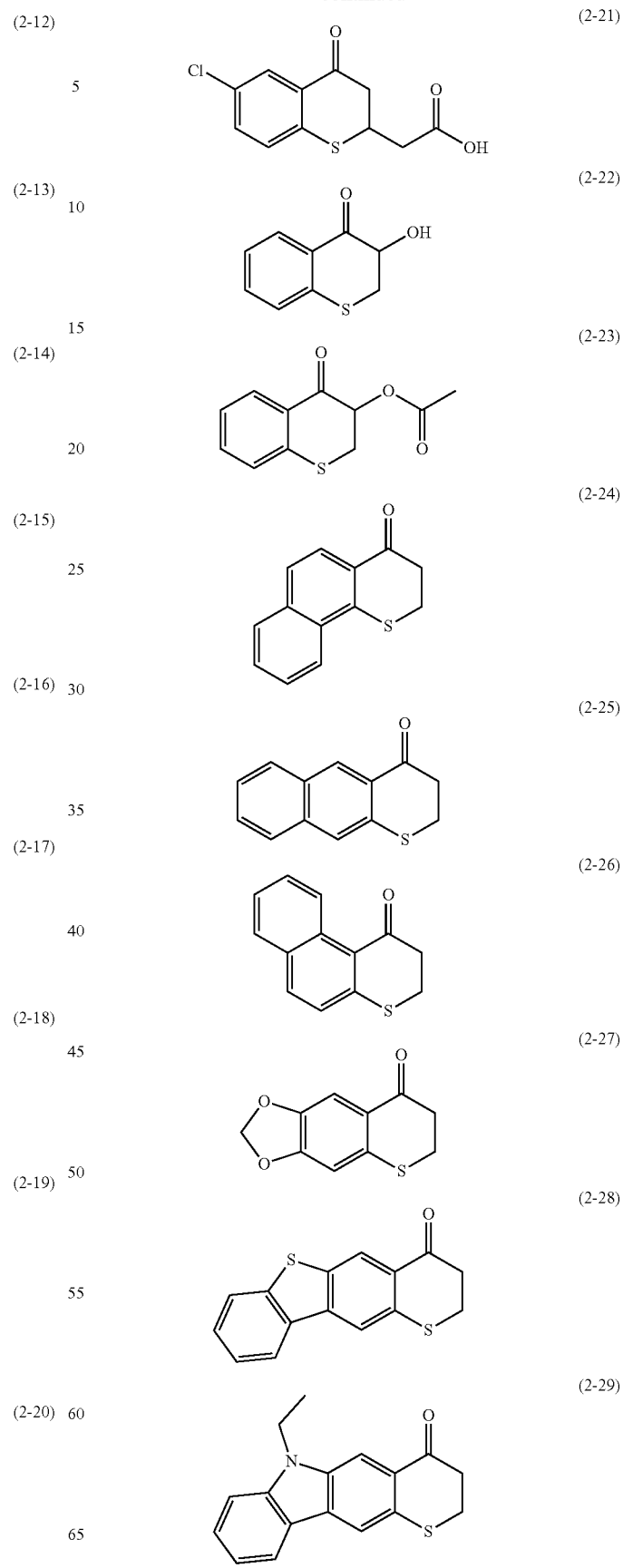
(2-21)
(2-22)
(2-23)
(2-24)
(2-25)
(2-26)
(2-27)
(2-28)
(2-29)

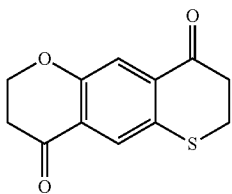

(2-30)

In a case where the ink according to the embodiment of the present disclosure contains at least one of a thioxanthone compound or a thiochromanone compound, a total content of the thioxanthone compound and the thiochromanone compound is preferably 0.1 mass % to 10 mass %, more preferably 0.5 mass % to 10 mass %, and even more preferably 1 mass % to 8 mass % with respect to a total ink amount.

<Polymerization Inhibitor>

The ink according to the embodiment of the present disclosure may contain a polymerization inhibitor.

Examples of the polymerization inhibitor include p-methoxyphenol (MEHQ), quinones (for example, hydroquinone, benzoquinone, and methoxybenzoquinone), phenothiazine, catechols, alkylphenols (for example, dibutylhydroxytoluene (BHT)), alkylbisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cuperon Al, and tris(N-nitroso-N-phenylhydroxylamine)aluminum salt.

Among these, at least one type selected from p-methoxyphenol, catechols, quinones, alkylphenols, TEMPO, TEMPOL, cuperon Al, and tris(N-nitroso-N-phenylhydroxylamine)aluminum salt is preferable, and at least one type selected from p-methoxyphenol, hydroquinone, benzoquinone, BHT, TEMPO, TEMPOL, cuperon Al, and tris(N-nitroso-N-phenylhydroxylamine)aluminum salt is more preferable.

In a case where the ink according to the embodiment of the present disclosure contains a polymerization inhibitor, the polymerization inhibitor content is preferably 0.01 mass % to 5 mass %, more preferably 0.1 mass % to 3 mass %, and even more preferably 0.3 mass % to 2 mass % with respect to a total ink amount.

<Surfactant>

The ink according to the embodiment of the present disclosure may contain a surfactant.

Examples of the surfactant include those described in JP1987-173463A (JP-S62-173463A) and JP1987-183457A (JP-S62-183457A). Examples thereof include anionic surfactants such as dialkyl sulfosuccinate, alkyl naphthalene sulfonate, and fatty acid salt, nonionic surfactants such as polyoxyethylene alkyl ether, polyoxyethylene alkyl allyl ether, acetylene glycol, polyoxyethylene/polyoxypropylene block copolymer, and siloxanes such as modified polydimethylsiloxane (for example, BYK-307 manufactured by BYK-CHEMIE), cationic surfactants such as alkylamine salt and quaternary ammonium salt, and betaine surfactants such as carbobetaine and sulfobetaine.

An organic fluoro-compound may be used instead of the surfactant. The organic fluoro-compound preferably has a hydrophobic property. The organic fluoro-compound includes fluorine-containing surfactants, oily fluorine-containing compounds (for example, fluorine oil), and solid-like fluorine compound resins (for example, tetrafluoroethylene resin), and examples thereof include the compounds described in JP1982-009053B (JP-S57-009053B) (Columns 8 to 17) and JP1987-135826A (JP-S62-135826A).

In a case where the ink according to the embodiment of the present disclosure contains a surfactant, the surfactant content is preferably 0.01 mass % to 5 mass %, more preferably 0.1 mass % to 3 mass %, and even more preferably 0.3 mass % to 2 mass % with respect to a total ink amount.

<Organic Solvent>

The ink according to the embodiment of the present disclosure may contain an organic solvent (for example, propylene glycol monomethyl ether acetate).

Examples of the organic solvent include ketones such as acetone, methyl ethyl ketone, and diethyl ketone;

alcohols such as methanol, ethanol, 2-propanol, 1-propanol, 1-butanol, and tert-butanol;

chlorinated solvents such as chloroform and methylene chloride;

aromatic solvents such as benzene and toluene;

ester solvents such as ethyl acetate, butyl acetate, isopropyl acetate, ethyl lactate, butyl lactate, and isopropyl lactate;

ether solvents such as diethyl ether, tetrahydrofuran, and dioxane; glycol ether solvents such as ethylene glycol monomethyl ether, ethylene glycol dimethyl ether, and propylene glycol monomethyl ether; and glycol ether acetate solvents such as propylene glycol monomethyl ether acetate.

The organic solvent content is preferably 1 mass % or less, more preferably 0.5 mass % or less, and even more preferably 0.1 mass % or less with respect to a total ink amount from the viewpoint of a further improvement in fine pattern formability of the ink.

The organic solvent content may be 0 mass % with respect to a total ink amount. That is, the ink according to the embodiment of the present disclosure may not contain an organic solvent.

<Other Components>

The ink of the present disclosure may contain components other than those described above.

Examples of other components include an antioxidant (for example, a hindered amine compound, a hindered phenol compound, a thioether compound, a phosphate ester compound, and a phosphorous ester compound), an ultraviolet absorber, a co-sensitizer, an antifading agent, and a conductive salt.

Regarding other components, known documents such as JP2011-225848A and JP2009-209352A can be appropriately referred to.

The ink according to the embodiment of the present disclosure preferably has a viscosity at 25° C. of 10 mPa·s to 40 mPa·s. The viscosity of the ink can be adjusted by, for example, adjusting a compositional ratio of each component to be contained.

Here, the viscosity is a value measured using a viscometer: VISCOMETER RE-85L (manufactured by Toki Sangyo Co., Ltd.).

In a case where the viscosity of the ink is within the above preferable range, the jetting stability of the ink is further improved.

The ink according to the embodiment of the present disclosure can be used without particular limitation in the formation of a light shielding film.

The object in which a light shielding film is formed is not particularly limited, and examples thereof include an electronic device (for example, a solid-state imaging element and a touch panel), a display device (for example, a liquid crystal display device and an organic electroluminescent display device), and an optical member (for example, an optical lens).

[Light Shielding Film]

A light shielding film according to the embodiment of the present disclosure is a cured product of the above-described ink according to the embodiment of the present disclosure.

Since the light shielding film according to the embodiment of the present disclosure contains titanium black, it has a more excellent light shielding property than a light shielding film containing carbon black instead of titanium black.

Furthermore, since the light shielding film according to the embodiment of the present disclosure is a cured product of the above-described ink according to the embodiment of the present disclosure, it can be formed by an ink jet method. Moreover, the light shielding film according to the embodiment of the present disclosure has an excellent light shielding property even in a case where it is a light shielding film containing titanium black and is formed by an ink jet method.

The thickness of the light shielding film according to the embodiment of the present disclosure is, for example, 5 nm to 5,000 nm, preferably 5 nm to 1,000 nm, more preferably 10 nm to 500 nm, and even more preferably 10 nm to 100 nm.

[Method of Manufacturing Light Shielding Film]

A method of manufacturing a light shielding film according to the embodiment of the present disclosure (hereinafter, also referred to as "manufacturing method according to the embodiment of the present disclosure") has a step of applying the ink according to the embodiment of the present disclosure to a base material by an ink jet method of the present disclosure to form an ink film (that is, a light shielding film before curing) (hereinafter, also referred to as "applying step"), and a step of irradiating the ink film with active energy rays to cure the ink film, thereby obtaining a light shielding film (hereinafter, also referred to as "irradiation step").

The manufacturing method according to the embodiment of the present disclosure may have other steps as necessary.

<Applying Step>

The applying step is a step of applying the above-described ink according to the embodiment of the present disclosure to a base material by an ink jet method to form an ink film.

The ink film is not particularly limited, and may be a solid-patterned ink film, a patterned (character, figure, symbol, etc.) ink film, or a white-patterned (white character, white figure, white symbol, etc.) ink film.

The base material preferably has a plate shape.

As the base material, a semiconductor substrate such as a silicon substrate, a glass substrate, a plastic substrate, or the like can be used.

As a base material, a base material previously provided with wiring, a transistor, a diode, a light-receiving element, a sensor, an actuator, or the like may be used.

Examples of the plastic of the plastic substrate include polyethylene terephthalate (PET), polyethylene naphthalate (PEN), polycarbonate (PC), triacetyl cellulose (TAC), polyimide (PI), polybenzoxazole (PBO), and cycloolefin polymer (COP).

A gas barrier layer and/or a solvent-resistant layer may be provided on a surface of the plastic substrate.

The application of the ink by an ink jet method can be performed using a known ink jet recording device.

The ink jet recording device is not particularly limited, and a known ink jet recording device which can achieve a target resolution can be arbitrarily selected and used.

Examples of the ink jet recording device include a device including an ink supply system, a temperature sensor, and heating means.

The ink supply system includes, for example, an original tank containing an ink, a supply pipe, an ink supply tank immediately before an ink jet head, a filter, and a piezo-type ink jet head. The piezo-type ink jet head can be driven so as to jet multi-size dots of preferably 1 pL to 100 pL, and more preferably 8 pL to 30 pL at a resolution of preferably 320 dpi (dot per inch)×320 dpi to 4,000 dpi×4,000 dpi, more preferably 400 dpi×400 dpi to 1,600 dpi×1,600 dpi, and even more preferably 720 dpi×720 dpi to 1,600 dpi×1,600 dpi. dpi represents the number of dots per 2.54 cm (1 inch).

<Irradiation Step>

The irradiation step is a step of irradiating the ink film formed on the base material with active energy rays to cure the ink film, thereby obtaining a light shielding film.

Specifically, by irradiating the ink film with active energy rays, a polymerization reaction of the monomer in the ink film proceeds, and the ink film is cured.

Examples of the active energy rays which can be used in the irradiation step include ultraviolet light, visible light, and electron rays. Among these, ultraviolet light is preferable.

The peak wavelength of the active energy rays is preferably 200 nm to 405 nm, more preferably 220 nm to 400 nm, even more preferably 250 nm to 400 nm, and still more preferably 300 nm to 400 nm.

In a case where the active energy rays are applied, the exposure surface illuminance is, for example, 10 mW/cm$^2$ to 2,000 mW/cm$^2$, preferably 500 mW/cm$^2$ to 2,000 mW/cm$^2$, and more preferably 800 mW/cm$^2$ to 1,500 mW/cm$^2$.

In a case where the active energy rays are applied, the exposure energy is, for example, 10 mJ/cm$^2$ to 20,000 mJ/cm$^2$, preferably 500 mJ/cm$^2$ to 20,000 mJ/cm$^2$, and more preferably 800 mJ/cm$^2$ to 15,000 mJ/cm$^2$.

Examples of the source for generating the active energy rays include metal halide lamps, ultra high pressure mercury lamps, high pressure mercury lamps, medium pressure mercury lamps, low pressure mercury lamps, UV fluorescent lamps, gas lasers, solid-state lasers, light emitting diodes (LEDs), and laser diodes (LDs).

In the irradiation step, the irradiation time of the active energy rays with respect to the ink applied to the base material is preferably 0.01 seconds to 30 seconds, more preferably 0.05 seconds to 10 seconds, and even more preferably. 0.1 seconds to 5 seconds.

As irradiation conditions and a basic irradiation method, the irradiation conditions and the irradiation method disclosed in JP1985-132767A (JP-S60-132767A) can be similarly applied.

As an active energy ray irradiation method, specifically, a method in which a light source is provided on both sides of a head unit including an ink jetting device, and the head unit and the light source are scanned by a so-called shuttle method, or a method in which active energy rays are applied by another light source accompanied by no driving is preferable.

(Heating and Drying Step)

The manufacturing method according to the embodiment of the present disclosure may further include a heating and drying step after the application step and before the irradiation step as necessary.

Heating means is not particularly limited, and examples thereof include a heat drum, hot air, an infrared lamp, a heat oven, and heat plate heating.

The heating temperature is preferably 40° C. or higher, more preferably 40° C. to 150° C., and even more preferably 40° C. to 80° C.

EXAMPLES

Hereinafter, examples of the present disclosure will be described. However, the present disclosure is not limited to the following examples.

In Tables 1 and 2, "%" means mass %.

Deionized water was used as water.

Example 1

<Preparation of Ink>

Components shown in Table 1 were mixed to prepare an ink having a composition shown in Table 1.

<Evaluation of Light Shielding Property of Light Shielding Film>

Using an ink jet printer DMP-3000 manufactured by FUJIFILM Corporation, the ink was applied to a glass substrate in a solid pattern (that is, a solid image shape) by an ink jet method to form an ink film as a solid pattern.

In this case, the dot density was 1,200 dpi×1,200 dpi, and the amount of the ink jetted per droplet jetted from the ink jet head was 10 picoliters (pL).

As the glass substrate, "Corning 1737" (thickness: 0.7 mm) manufactured by Corning Incorporated was used.

The ink film obtained as above was irradiated with ultraviolet light (wavelength: 365 nm) using an ultraviolet light-emitting diode (NC4U134 manufactured by Nichia Corporation) to cure the ink film, and thus a light shielding film as a solid pattern was obtained.

In this case, the exposure time (that is, the ultraviolet light irradiation time) was 1 second, and the exposure energy amount (that is, the integrated light quantity of ultraviolet light) was 1,200 mJ/cm².

The transmission optical density (transmission OD; "OD" is an abbreviation of Optical Density) of the glass substrate on which the light shielding film was formed was measured using a desktop transmission densitometer 361T (manufactured by X-Rite, Inc).

Based on the obtained results, the light shielding property of the light shielding film was evaluated according to the following evaluation criteria.

In the following evaluation criteria, the highest light shielding property of the light shielding film is indicated by "AAA".

The results are shown in Table 1.

Evaluation Criteria of Light Shielding Property of Light Shielding Film

AAA: The transmission optical density of the glass substrate on which the light shielding film was formed was 4.0 or greater.

AA: The transmission optical density of the glass substrate on which the light shielding film was formed was 3.8 or greater and less than 4.0.

A: The transmission optical density of the glass substrate on which the light shielding film was formed was 3.5 or greater and less than 3.8.

B: The transmission optical density of the glass substrate on which the light shielding film was formed was 3.2 or greater and less than 3.5.

C: The transmission optical density of the glass substrate on which the light shielding film was formed was 2.9 or greater and less than 3.2.

D: The transmission optical density of the glass substrate on which the light shielding film was formed was less than 2.9.

<Evaluation of Fine Pattern Formability of Ink>

A light shielding film as a fine pattern was formed in the same manner as in the evaluation of the light shielding property of the light shielding film, except that the pattern for application of the ink was changed from a solid pattern to a fine pattern.

Here, the fine pattern includes a white character. The font size of the white character was 7 pt. Here, pt means a DTP point (desktop publishing point) representing a font size, and 1 pt is 1/72 inch.

FIG. 1 is a diagram conceptually showing a part of a fine pattern including a white character (a part of the white character) used for evaluation of the fine pattern formability of the ink.

The light shielding film as a fine pattern was visually observed, and the fine pattern formability of the ink was evaluated according to the following evaluation criteria.

In the following evaluation criteria, the highest fine pattern formability of the ink is indicated by "A".

The results are shown in Table 1.

Evaluation Criteria of Fine Pattern Formability of Ink

A: The pattern looks sharp and clear, and no blurring is seen.

B: Although blurring is partially seen, there is no visual problem.

C: Although blurring is seen throughout the pattern, there is no visual problem.

D: There are many defects and characters cannot be read.

Examples 2 to 24 and Comparative Examples 1 to 3

The operation was performed in the same manner as in Example 1, except that the composition of the ink was changed as shown in Tables 1 and 2. In Comparative Examples 1 to 3, the evaluation of the fine pattern formability of the ink was omitted.

The results are shown in Table 1.

TABLE 1

| Composition of Ink | | | Example 1 | Example 2 | Example 3 | Example 4 | Example 5 | Example 6 | Example 7 |
|---|---|---|---|---|---|---|---|---|---|
| Titanium Black | | | 14.0% | 14.0% | 14.0% | 14.0% | 14.0% | 14.0% | 14.0% |
| Dispersant | D-111 | Acidic | 4.2% | 4.2% | | | | 4.2% | 4.2% |
| | D-170 | Acidic | | | 4.2% | | | | |
| | D-118 | Acidic | | | | 4.2% | | | |
| | D-108 | Basic | | | | | 4.2% | | |

TABLE 1-continued

| Composition of Ink | | | | | | | | | |
|---|---|---|---|---|---|---|---|---|---|
| Monomer A (heterocyclic) | CTFA | Monofunctional | 21.0% | 11.0% | 11.0% | 11.0% | 11.0% | | 15.0% |
| | NVC | Monofunctional | | | | | | 11.0% | |
| | NVP | Mono functional | | | | | | | |
| | THFA | Monofunctional | | | | | | | |
| Monomer B (alicyclic) | IBXA | Monofunctional | | 10.0% | 10.0% | 10.0% | 10.0% | 10.0% | 6.0% |
| | FA-511AS | Monofunctional | | | | | | | |
| | CHA | Monofunctional | | | | | | | |
| Aromatic Monomer | PEA | Monofunctional | 48.3% | 48.3% | 48.3% | 48.3% | 48.3% | 48.3% | 48.3% |
| Other Monomers | TMPTA | Trifunctional | 2.5% | 2.5% | 2.5% | 2.5% | 2.5% | 2.5% | 2.5% |
| | NPGPODA | Bifunctional | | | | | | | |
| | 1,6-HDDA | Bifunctional | | | | | | | |
| Polymerization Initiator | IRG819 | | 3.0% | 3.0% | 3.0% | 3.0% | 3.0% | 3.0% | 3.0% |
| | TPO | | 5.0% | 5.0% | 5.0% | 5.0% | 5.0% | 5.0% | 5.0% |
| Surfactant | BYK307 | | 1.0% | 1.0% | 1.0% | 1.0% | 1.0% | 1.0% | 1.0% |
| Polymerization Inhibitor | MEHQ | | 1.0% | 1.0% | 1.0% | 1.0% | 1.0% | 1.0% | 1.0% |
| Organic Solvent | PGMEA | | | | | | | | |
| Thioxanthone | DETX | | | | | | | | |
| Total | | | 100% | 100% | 100% | 100% | 100% | 100% | 100% |
| Ratio [Total Monomer Amount/Total Ink Amount] | | | 72% | 72% | 72% | 72% | 72% | 72% | 72% |
| Ratio [Monomer A/Total Monomer Amount] | | | 29% | 15% | 15% | 15% | 15% | 15% | 21% |
| Ratio [Monomer B/Monomer A] | | | 0% | 91% | 91% | 91% | 91% | 91% | 40% |
| Ratio [Monofunctional Monomer/Total Monomer Amount] | | | 97% | 97% | 97% | 97% | 97% | 97% | 97% |
| Evaluation Results | Light Shielding Property of Light Shielding Film | | B | AA | AA | AA | B | AA | AA |
| | Fine Pattern Formability | | B | A | B | A | B | A | A |

| Composition of Ink | | | Example 8 | Example 9 | Example 10 | Example 11 | Example 12 | Example 13 | Example 14 |
|---|---|---|---|---|---|---|---|---|---|
| Titanium Black | | | 14.0% | 14.0% | 14.0% | 14.0% | 14.0% | 14.0% | 14.0% |
| Dispersant | D-111 | Acidic | 4.2% | 4.2% | 4.2% | 4.2% | 4.2% | 4.2% | 4.2% |
| | D-170 | Acidic | | | | | | | |
| | D-118 | Acidic | | | | | | | |
| | D-108 | Basic | | | | | | | |
| Monomer A (heterocyclic) | CTFA | Monofunctional | 16.0% | 11.0% | 6.0% | 8.0% | 10.5% | 10.0% | 15.0% |
| | NVC | Monofunctional | | | | | 10.5% | | |
| | NVP | Mono functional | | | | | | | |
| | THFA | Monofunctional | | | | | | | |
| Monomer B (alicyclic) | IBXA | Monofunctional | 5.0% | | 15.0% | 13.0% | | | |
| | FA-511AS | Monofunctional | | 10.0% | | | | | |
| | CHA | Monofunctional | | | | | | | |
| Aromatic Monomer | PEA | Monofunctional | 48.3% | 48.3% | 48.3% | 48.3% | 48.3% | 59.3% | 38.3% |
| Other Monomers | TMPTA | Trifunctional | 2.5% | 2.5% | 2.5% | 2.5% | 2.5% | 2.5% | 12.5% |
| | NPGPODA | Bifunctional | | | | | | | |
| | 1,6-HDDA | Bifunctional | | | | | | | 6.0% |
| Polymerization Initiator | IRG819 | | 3.0% | 3.0% | 3.0% | 3.0% | 3.0% | 3.0% | 3.0% |
| | TPO | | 5.0% | 5.0% | 5.0% | 5.0% | 5.0% | 5.0% | 5.0% |
| Surfactant | BYK307 | | 1.0% | 1.0% | 1.0% | 1.0% | 1.0% | 1.0% | 1.0% |
| Polymerization Inhibitor | MEHQ | | 1.0% | 1.0% | 1.0% | 1.0% | 1.0% | 1.0% | 1.0% |
| Organic Solvent | PGMEA | | | | | | | | |
| Thioxanthone | DETX | | | | | | | | |
| Total | | | 100% | 100% | 100% | 100% | 100% | 100% | 100% |
| Ratio [Total Monomer Amount/Total Ink Amount] | | | 72% | 72% | 72% | 72% | 72% | 72% | 72% |
| Ratio [Monomer A/Total Monomer Amount] | | | 22% | 15% | 8% | 11% | 29% | 14% | 21% |
| Ratio [Monomer B/Monomer A] | | | 31% | 91% | 250% | 163% | 0% | 0% | 0% |
| Ratio [Monofunctional Monomer/Total Monomer Amount] | | | 97% | 97% | 97% | 97% | 97% | 97% | 74% |
| Evaluation Results | Light Shielding Property of Light Shielding Film | | A | AA | A | AA | B | B | C |
| | Fine Pattern Formability | | B | A | B | A | B | B | B |

TABLE 2

| Composition of Ink | | | Example 15 | Example 16 | Example 17 | Example 18 | Example 19 | Example 20 | Example 21 |
|---|---|---|---|---|---|---|---|---|---|
| | Titanium Black | | 14.0% | 14.0% | 14.0% | 14.0% | 14.0% | 14.0% | 14.0% |
| Dispersant | D-111 | Acidic | 4.2% | 4.2% | 4.2% | 4.2% | 4.2% | 4.2% | 4.2% |
| | D-170 | Acidic | | | | | | | |
| | D-118 | Acidic | | | | | | | |
| | D-108 | Basic | | | | | | | |
| Monomer A (heterocyclic) | CTFA | Monofunctional | 30.0% | 21.0% | | | 11.0% | 11.0% | 11.0% |
| | NVC | Monofunctional | 17.0% | | | | | 2.5% | |
| | NVP | | | | 11.0% | | | | |
| | THFA | | | | | 11.0% | | | |
| Monomer B (alicyclic) | IBXA | Monofunctional | 17.0% | | 10.0% | 10.0% | | 10.0% | 10.0% |
| | FA-511AS | Monofunctional | | | | | | | |
| | CHA | Monofunctional | | | | | 10.0% | | |
| Aromatic Monomer | PEA | Monofunctional | 0.0% | 46.8% | 48.3% | 48.3% | 48.3% | 48.3% | 46.3% |
| Other Monomers | TMPTA | Trifunctional | 2.5% | 2.5% | 2.5% | 2.5% | 2.5% | | 2.5% |
| | NPGPODA | Bifunctional | 5.0% | | | | | | |
| | 1,6-HDDA | Bifunctional | | | | | | | |
| Polymerization Initiator | IRG819 | | 3.0% | 3.0% | 3.0% | 3.0% | 3.0% | 3.0% | 3.0% |
| | TPO | | 5.0% | 5.0% | 5.0% | 5.0% | 5.0% | 5.0% | 5.0% |
| Surfactant | BYK307 | | 1.0% | 1.0% | 1.0% | 1.0% | 1.0% | 1.0% | 1.0% |
| Polymerization Inhibitor | MEHQ | | 1.0% | 1.0% | 1.0% | 1.0% | 1.0% | 1.0% | 1.0% |
| Organic Solvent | PGMEA | | | 1.5% | | | | | |
| Thioxanthone | DETX | | | | | | | | 2.0% |
| Total | | | 100% | 100% | 100% | 100% | 100% | 100% | 100% |
| Ratio [Total Monomer Amount/Total Ink Amount] | | | 72% | 70% | 72% | 72% | 72% | 72% | 70% |
| Ratio [Monomer A/Total Monomer Amount] | | | 66% | 30% | 15% | 15% | 15% | 19% | 16% |
| Ratio [Monomer B/Monomer A] | | | 36% | 0% | 91% | 91% | 91% | 74% | 91% |
| Ratio [Monofunctional Monomer/Total Monomer Amount] | | | 90% | 96% | 97% | 97% | 97% | 100% | 96% |
| Evaluation Results of Cured Film | Light Shielding Property of Light Shielding Film | | AA | B | AA | AA | AA | AA | AAA |
| | Fine Pattern Formability | | B | C | A | A | A | A | A |

| Composition of Ink | | | Example 22 | Example 23 | Example 24 | Comparative Example 1 | Comparative Example 2 | Comparative Example 3 |
|---|---|---|---|---|---|---|---|---|
| | Titanium Black | | 14.0% | 14.0% | 14.0% | 14.0% | 14.0% | 14.0% |
| Dispersant | D-111 | Acidic | 4.2% | 4.2% | 4.2% | 4.2% | 4.2% | 4.2% |
| | D-170 | Acidic | | | | | | |
| | D-118 | Acidic | | | | | | |
| | D-108 | Basic | | | | | | |
| Monomer A (heterocyclic) | CTFA | Monofunctional | 11.0% | 11.0% | 30.0% | | | |
| | NVC | Monofunctional | | 8.0% | 17.0% | | | |
| | NVP | | | | | | | |
| | THFA | | | | | | | |
| Monomer B (alicyclic) | IBXA | Monofunctional | | | 17.0% | | 10.0% | 21.0% |
| | FA-511AS | Monofunctional | | | | | | |
| | CHA | Monofunctional | 10.0% | 7.0% | | | | |
| Aromatic Monomer | PEA | Monofunctional | 46.3% | 38.0% | 0.0% | 69.3% | 59.3% | 48.3% |
| Other Monomers | TMPTA | Trifunctional | 2.5% | 2.5% | 2.5% | 2.5% | 2.5% | 2.5% |
| | NPGPODA | Bifunctional | | | 3.0% | 3.0% | | |
| | 1,6-HDDA | Bifunctional | | 3.0% | | | | |
| Polymerization Initiator | IRG819 | | 3.0% | 3.0% | 3.0% | 3.0% | 3.0% | 3.0% |
| | TPO | | 5.0% | 5.0% | 5.0% | 5.0% | 5.0% | 5.0% |
| Surfactant | BYK307 | | 1.0% | 1.0% | 1.0% | 1.0% | 1.0% | 1.0% |
| Polymerization Inhibitor | MEHQ | | 1.0% | 1.0% | 1.0% | 1.0% | 1.0% | 1.0% |
| Organic Solvent | PGMEA | | | | | | | |
| Thioxanthone | DETX | | 2.0% | 2.0% | 2.0% | | | |
| Total | | | 100% | 100% | 100% | 100% | 100% | 100% |
| Ratio [Total Monomer Amount/Total Ink Amount] | | | 70% | 70% | 70% | 72% | 72% | 72% |
| Ratio [Monomer A/Total Monomer Amount] | | | 16% | 27% | 68% | 0% | 0% | 0% |
| Ratio [Monomer B/Monomer A] | | | 91% | 37% | 36% | — | — | — |
| Ratio [Monofunctional Monomer/Total Monomer Amount] | | | 96% | 92% | 92% | 97% | 97% | 97% |
| Evaluation Results of Cured Film | Light Shielding Property of Light Shielding Film | | AAA | AAA | AAA | D | D | D |
| | Fine Pattern Formability | | A | A | A | — | — | — |

In Tables 1 and 2, "%" means mass %.

In Tables 1 and 2, a blank means that the corresponding component is not contained.

The details of the components in Tables 1 and 2 are as follows.

Titanium Black

Titanium Black . . . "Titanium Black 13M-T" manufactured by Mitsubishi Materials Electronic Chemicals Co., Ltd. (average primary particle diameter: 67 nm)

Dispersant

D-111 . . . "DISPERBYK-111" manufactured by BYK-CHEMIE (acidic dispersant, acid value: 129 mgKOH/g, acid group-containing copolymer)

D-170 . . . "DISPERBYK-170" manufactured by BYK-CHEMIE (acidic dispersant, acid value: 11 mgKOH/g, block copolymer having affinity for pigment)

D-118 . . . "DISPERBYK-118" manufactured by BYK-CHEMIE (acidic dispersant, acid value: 36 mgKOH/g, linear polymer having pigment affinity group)

D-108 . . . "DISPERBYK-108" manufactured by BYK-CHEMIE (basic dispersant, amine value: 71 mgKOH/g, hydroxyl group-containing carboxylic acid ester)

Monomer A (Non-Aromatic Heterocyclic Compound having Ethylenic Double Bond)

CTFA . . . cyclic trimethylolpropane formal acrylate (monofunctional monomer)

NVC . . . N-vinylcaprolactam (monofunctional monomer)

NVP . . . N-vinylpyrrolidone (monofunctional monomer)

THFA . . . tetrahydrofurfuryl acrylate (monofunctional monomer)

Monomer B (Alicyclic Compound having Ethylenic Double Bond)

IBXA . . . isobornyl acrylate (monofunctional monomer)

FA-511AS . . . "FANCRYL FA-511AS" manufactured by Hitachi Chemical Co., Ltd. (dicyclopentenyl acrylate) (monofunctional monomer)

CHA . . . cyclohexyl acrylate

Aromatic Monomer

PEA . . . phenoxyethyl acrylate (monofunctional monomer)

Other Monomers

TMPTA . . . trimethylolpropane triacrylate (trifunctional monomer)

NPGPODA . . . neopentyl glycol propylene oxide adduct diacrylate (bifunctional monomer)

1,6-HDDA . . . 1,6-hexanediol diacrylate (bifunctional monomer)

Polymerization Initiator

IRG819 . . . "IRGACURE (registered trademark) 819" manufactured by BASF SE (acylphosphine oxide-based photopolymerization initiator; specifically bis(2,4,6-trimethylbenzoyl)phenylphosphine oxide)

TPO . . . "IRGACURE (registered trademark) TPO" manufactured by BASF SE (acylphosphine oxide-based photopolymerization initiator; specifically 2,4,6-trimethylbenzoyl-diphenyl-phosphine oxide)

Surfactant

BYK 307 . . . "BYK-307" manufactured by BYK-CHEMIE (silicon-based surfactant; specifically, polyether-modified polydimethylsiloxane)

Polymerization Inhibitor

MEHQ . . . p-methoxyphenol (Tokyo Chemical Industry Co., Ltd.)

Organic Solvent

PGMEA . . . propylene glycol monomethyl ether acetate

Thioxanthone Compound

DETX . . . 2,4-diethylthioxanthone (KAYACURE DETX, manufactured by Nippon Kayaku Co., Ltd.)

The viscosity at 25° C. of the ink prepared in each of Examples 1 to 24 and Comparative Examples 1 to 3 was within a range of 10 mPa·s to 40 mPa·s.

The viscosity was measured using a viscometer (VISCOMETER RE-85L (manufactured by Toki Sangyo Co., Ltd.)).

The thickness of the light shielding film produced in each of Examples 1 to 24 and Comparative Examples 1 to 3 was within a range of 10 nm to 20 nm.

As shown in Table 1 and Table 2, the light shielding films obtained using the inks of Examples 1 to 24 containing titanium black and a monomer A, which is a non-aromatic heterocyclic compound having an ethylenically unsaturated double bond, had an excellent light shielding property.

In contrast, the light shielding films obtained using the inks of Comparative Examples 1 to 3 containing no monomer A had a poor light shielding property.

From the results of Examples 1, 2, 12, and 19, it is found that in a case where the ink further contains a monomer B which is an alicyclic compound having an ethylenically unsaturated double bond (Examples 2 and 19), the light shielding property of the light shielding film and the fine pattern formability of the ink are further improved.

From the results of Examples 2, 7, 8, 10 and 11, it is found that in a case where the ratio [monomer B/monomer A] is 35 mass % to 200 mass % in the ink (Examples 2, 7, and 11), the light shielding property of the light shielding film and the fine pattern formability of the ink are further improved.

From the results of Examples 10 and 11, it is found that in a case where the ratio [monomer A/total monomer amount] is 10 mass % or greater in the ink (Example 11), the light shielding property of the light shielding film and the fine pattern formability of the ink are further improved.

From the results of Examples 1 to 24, it is found that in a case where the content of the monofunctional monomer with respect to a total amount of the monomers in the ink is 80 mass % or greater (Examples 1 to 13 and 15 to 24), the light shielding property of the light shielding film is further improved.

From the results of Examples 1 to 24, it is found that in a case where the organic solvent content is 1 mass % or less in the ink (Examples 1 to 15 and 17 to 24), the fine pattern formability of the ink is further improved.

From the results of Examples 2 to 5, it is found that in a case where the ink contains an acidic dispersant (Examples 2 to 4), the light shielding property of the light shielding film is further improved.

From the results of Examples 2 to 4, it is found that in a case where the acid value of the acidic dispersant is 20 mgKOH/g or greater (Examples 2 and 4), the fine pattern formability of the ink is further improved.

From the results of Examples 2, 15, 19, and 21 to 24, it is found that in a case where the ink contains a thioxanthone compound (Examples 21 to 24), the light shielding property of the light shielding film is further improved. In view of these results, it is expected that the same effect as in a case where the ink contains a thioxanthone compound is also obtained in a case where the ink contains a thiochromanone compound (see Formula (2)) containing a main part of the skeleton (see Formula (1)) of the thioxanthone compound.

The disclosure of JP2017-187087 filed on Sep. 27, 2017 is incorporated into this specification by reference.

All the documents, patent applications, and technical standards described in this specification are incorporated into this specification by reference to the same extent as in cases where the respective documents, patent applications and technical standards are concretely and individually described to be incorporated by reference.

What is claimed is:

1. A method of manufacturing a light shielding film, comprising:
    applying an active energy ray curable-type ink jet ink to a base material by an ink jet method to form an ink film; and
    irradiating the ink film with active energy rays to cure the ink film, thereby obtaining a light shielding film,
    the active energy ray curable-type ink jet ink comprising:
    titanium black;
    a monomer A which is a non-aromatic heterocyclic compound having an ethylenically unsaturated double bond;
    a monomer B which is an alicyclic compound having an ethylenically unsaturated double bond; and
    an acidic dispersant.

2. The method of manufacturing a light shielding film according to claim 1,
    wherein the ink has a content of the monomer B of 35 mass % to 200 mass % with respect to a content of the monomer A.

3. The method of manufacturing a light shielding film according to claim 1,
    wherein a content of the monomer A is 10 mass % or greater with respect to a total amount of the monomers in the active energy ray curable-type ink jet ink.

4. The method of manufacturing a light shielding film according to claim 1,
    wherein a monofunctional monomer content is 80 mass % or greater with respect to a total amount of the monomers in the active energy ray curable-type ink jet ink.

5. The method of manufacturing a light shielding film according to claim 1,
    wherein an organic solvent content is 1 mass % or less with respect to a total amount of the active energy ray curable-type ink jet ink.

6. The method of manufacturing a light shielding film according to claim 1,
    wherein the active energy ray curable-type ink jet ink further comprises at least one of a thioxanthone compound or a thiochromanone compound.

7. The method of manufacturing a light shielding film according to claim 6,
    wherein a total content of the thioxanthone compound and the thiochromanone compound is 1 mass % to 8 mass % with respect to a total amount of the active energy ray curable-type ink jet ink.

8. The method of manufacturing a light shielding film according to claim 1,
    wherein the acidic dispersant has an acid value of 20 mgKOH/g or greater.

9. A light shielding film which is a product obtained by the method according to claim 1.

* * * * *